United States Patent [19]

Kawakami et al.

[11] 3,975,653
[45] Aug. 17, 1976

[54] CREEPING DISCHARGE AND PARTIAL DISCHARGE PREVENTION MEANS FOR A COIL END OF A ROTARY ELECTRIC MACHINE

[75] Inventors: Takeshi Kawakami; Tsutomu Tani; Takatoshi Ishikawa; Syoji Hirabayashi, all of Amagasaki, Japan

[73] Assignee: Mitsubishi Denki Kabushiki Kaisha, Tokyo, Japan

[22] Filed: Mar. 13, 1975

[21] Appl. No.: 557,910

[30] Foreign Application Priority Data
Apr. 17, 1974 Japan.................. 49-43810

[52] U.S. Cl. .................. 310/196; 174/73 R; 174/127; 310/256
[51] Int. Cl.² .......................... H02K 3/40
[58] Field of Search.......... 310/196, 256, 73 R, 310/73 SC; 174/127 R

[56] References Cited
UNITED STATES PATENTS

| | | |
|---|---|---|
| 1,784,997 | 12/1930 | Schenkel.................. 174/73 SC |
| 3,210,460 | 10/1965 | Suelmann.................. 174/73 R |
| 3,508,096 | 4/1970 | Kull et al. ................. 310/196 |
| 3,631,519 | 12/1971 | Salahshourian............. 174/127 X |

FOREIGN PATENTS OR APPLICATIONS

| | | |
|---|---|---|
| 741,239 | 11/1943 | Germany.................. 350/196 |

*Primary Examiner*—Donovan F. Duggan
*Attorney, Agent, or Firm*—Oblon, Fisher, Spivak, McClelland & Maier

[57] ABSTRACT

A creeping discharge and partial discharge-prevention means for a stator coil end of a rotary electric machine is disclosed. It includes an grounding electrode on an insulator of the stator coil end of the rotary electric machine, a first electrical stress grading coated layer on the insulator of the coil end including the end of the grounding electrode, a shield insulator made of insulation material around the first electrical stress grading coated layer including the end of the grounding electrode, a shield electrode electrically connected to the grounding electrode around the shield insulator, and a second electrical stress grading coated layer coated on the shield insulator including the end of the shield electrode.

6 Claims, 7 Drawing Figures

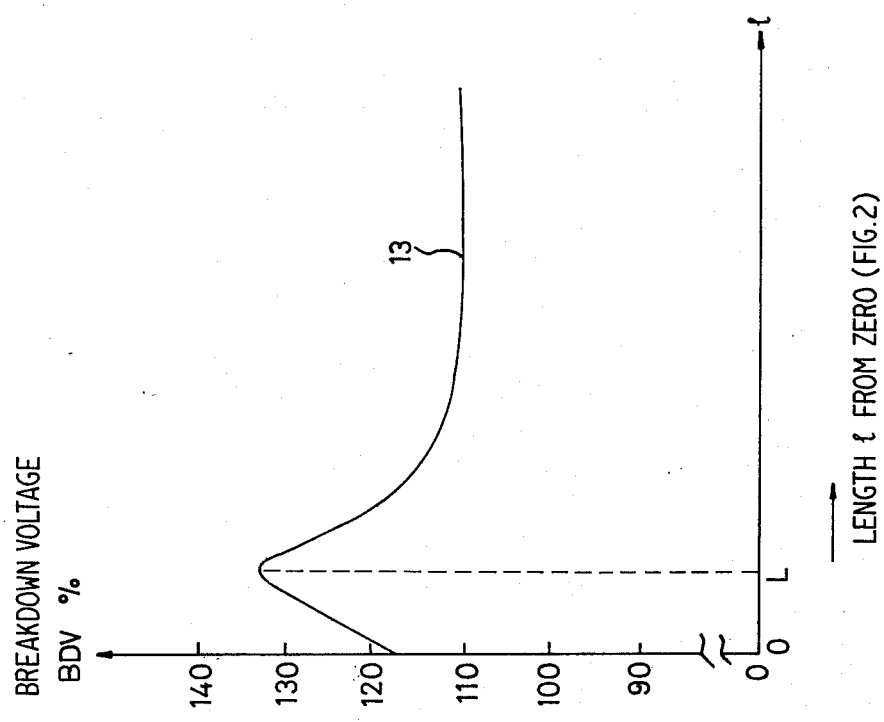
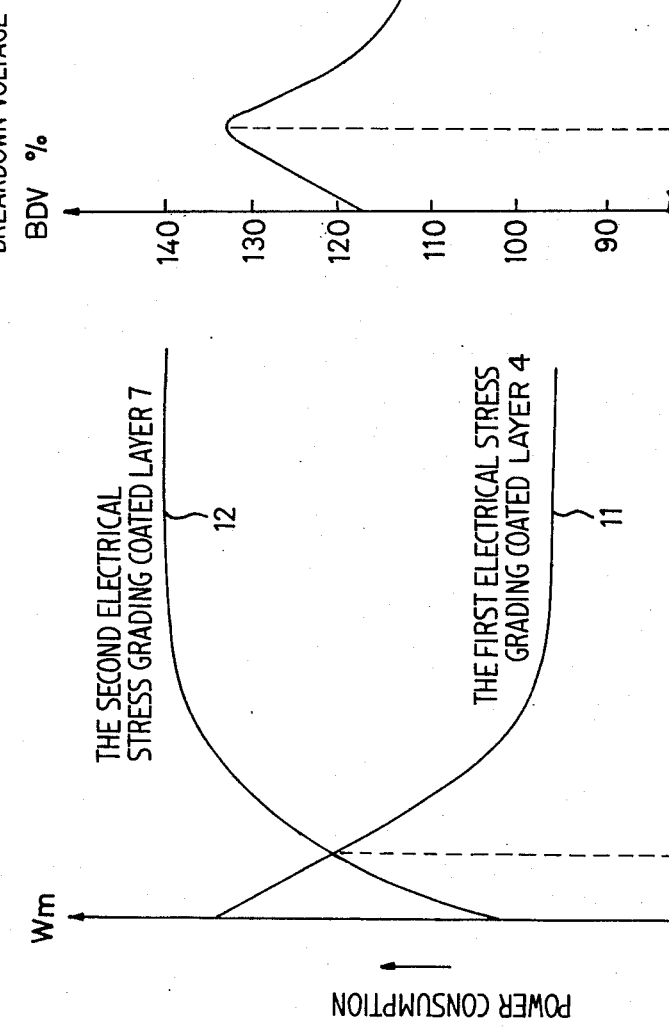

CREEPING DISCHARGE AND PARTIAL DISCHARGE PREVENTION MEANS FOR A COIL END OF A ROTARY ELECTRIC MACHINE

BACKGROUND OF THE INVENTION

1. Field of the Invention

The present invention relates to a creeping discharge-prevention means or a partial discharge-preventions means for a stator coil end used for a rotary electric machine.

2. Description of the Prior Art

In general, a stator coil for a high voltage rotary electric machine is insulated from the ground by using an insulator made of organic or inorganic insulation material or a mixture thereof. An electric conductive paint is coated on the surface of the insulator on a linear part of the coil disposed in a slot of the iron core of a stator in a length the same or longer than the length of the iron core.

When the stator coil is disposed in the iron core of a stator having ground potential, the surface of the iron core and the coil of the stator has a potential higher than the ground potential for a potential drop caused by the resistance of the conductive layer coated on the surface of the coil.

However the potential difference is quite small so that the potential of the conductive coated layer is substantially the same as ground potential.

When the voltage is applied to the conductive wire of the coil of a stator, the conductive wire of the coil and the grounding electrode of the conductive coated layer form a pair of electrodes so that the line of electric force is crossed to the surface of the insulator at the coil end. The electrostatic capacity between the pair of electrodes is high. Accordingly, the potential gradient of the surface of the insulator in the creeping direction of the coil is high. The potential gradient is especially high at the end of the grounding electrode and a partial discharge or a creeping discharge is easily caused at the part having a high potential gradient.

The potential gradient increases depending upon an increase of the voltage applied to the coil. Accordingly, the discharge is easily caused from a coil having higher rated voltage then from a coil having a lower rated voltage. When a stator coil for a high voltage rotary electric machine is manufactured, the dielectric strength test of Japanese Electrotechnical Committee — 114 (1965) is carried out under the Rule. For example, in the case that the rated capacity of the rotary electric machine is 10,000 KW or higher and the rated voltage $E$ is higher than 6,000 V, the coil should be satisfactory in the dielectric strength test of the insulator layer to the charging part while applying the test voltage $Et$ for 1 minute, wherein $$Et = 2E + 3{,}000 \text{ V} \tag{1}$$

(effective value)

In a manufacturing factory of the rotary electric machine, it is usual to carry out the dielectric strength test by applying a test voltage of about $1.1 \sim 2.0\ Et$ in the process of manufacture so as to confirm the reliability of the insulator part of the rotary electric machines. Accordingly, in tests of rotary electric machines having rated voltage of 20 KV to 20 KV, the test voltage is quite high. Thus, the potential gradient is remarkably high because of the high voltage applied to the coil. Accordingly, sometimes it is difficult to carry out the dielectric strength test because of the creeping discharge during application of a voltage lower than the test voltage.

The purpose of the present invention is to provide simple and effective circuitry for preventing a partial discharge or a creeping discharge of the coil end of the stator having a high rated voltage by decreasing the potential gradient of the surface of the stator coil end for the rotary electric machine in the creeping direction.

FIG. 1 is a partial sectional view of a conventional stator coil end. In FIG. 1, the reference numeral 1 designates a conductive wire of a coil; 2 designates an insulator; 3 designates a grounding electrode such as a conductive coated layer of paint.

When a high voltage is applied to the conductive wire 1 of the coil, a pair of electrodes are formed by the conductive wire 1 and the grounding electrode 3 whereby the potential gradient at the end of the grounding electrode 3 in the creeping direction of the coil is high. In order to prevent the increase of potential gradient, it has been proposed to coat an electrical stress grading paint 4 on the surface of the insulator 2 including the end of the grounding electrode 3.

The electrical stress grading coated layer 4 should have a non-linear characteristic of resistance of the coated film to the field to impart resistance as an insulator in a low field intensity and resistance as a semiconductor in a high field intensity.

When the electrical stress grading coated layer having nonlinear resistance is disposed at the stator coil end, and the voltage $V$ (effective value) is applied to the conductive wire 1, the current is passed through the electrical stress grading coated layer 4 depending upon the charge current to cause power consumption. The relation of the voltage $V$ to the maximum power consumption $Wm$ in the electrical stress grading coated layer 4 is given by the equation $$Wm = 1.3\ \omega c\ V^2\ [W/m^2] \tag{2}$$

wherein $\omega = 2\ \pi f$;
$f$ represents the frequency of the power source [Hz];
and $c$ represents the electrostatic capacity per unit area of an insulator of the coil. [F/m²].

The power consumption is proportional to the square of the voltage applied. The power consumption caused by Joule heat as the basic property of the commercial electrical stress grading coated layer at the breakdown is about $1 \sim 2 \times 10^4$ [W/m²]. Accordingly, when the field intensity reducing coated film is disposed at the stator coil end, the power consumption $Wm$ of Equation (2) is limited and the voltage $V$ applied is limited. That is, the electrical stress grading coated layer 4 is burned by the Joule heat of Equation (2) in a coil having a high rated voltage. The burning of the electrical stress grading layer 4 causes the deterioration of the insulation of the insulator 2 or the loss of a non-linear characteristic of resistance of the electrical stress grading coated layer 4 causing a linear characteristic of resistance to act as an insulator.

The loss of the non-linear characteristic of resistance of the electrical stress grading coated layer 4 yields resistance as an insulator in a high field intensity. Accordingly, the effect of the electrical stress grading coated layer 4 is lost and the potential gradient at the end of the ground electrode 3 is increased to cause the creeping discharge. Accordingly, the applicable voltage V under the use of the electrical stress grading coated layer is limited.

In order to overcome the disadvantage from the use of the electrical stress grading coated layer, the voltage applied under the use of the coated layer can be increased by increasing the thickness of the insulator 2. However, it is not satisfactorily effective as described below. The method utilized is to decrease the power consumption Wm by decreasing the electrostatic capacity c of Equation (2). It is known that the applicable voltage can be increased by decreasing the power consumption Wm as an effect of the thickness of the insulator.

In the conventional method for reducing the creeping field intensity of the surface of a coil by disposing voltage dividing electrodes into the insulator 2 at the coil end (c voltage dividing method), it is necessary to dispose certain voltage dividing electrodes into the insulator 2. It is quite difficult to control the positions of the electrodes and accordingly the operation efficiency in the manufacture of the coil is disadvantageously low. Moreover, as the electrodes are disposed into the insulator 2, the substantial disadvantage of deterioration of insulation of the insulator 2 to the ground has been found to exist. As illustrated above, the effect of the field of intensity reducing coated film is limited. Accordingly, the conventional method can not be applied for a stator coil having a high rated voltage. Further, the method for increasing the thickness of an insulator does not impart a desirable effect and the c voltage dividing method has the above-mentioned disadvantages.

SUMMARY OF THE INVENTION

It is accordingly an object of the present invention to provide an improvement of the conventional electrical stress grading method for applying to a coil end of a stator having a rated voltage higher than the rated voltage of the conventional one by providing a shield electrode and a shield electrical stress grading coated layer through a shield insulator around a grounding electrode and an electrical stress grading coated layer of the stator coil so as to reduce current passed through the electrical stress grading coated layer or the shield electrical stress grading coated layer and to reduce the power consumption to the coated layer.

It is another object of the invention to provide a creeping discharge-prevention means for a coil end of a stator having a rated voltage higher than the rated voltage of a conventional one.

The foregoing and other objects are attained in accordance with one aspect of the present invention through the provision of a stator coil end of a rotary electric machine which comprises a grounding electrode on an insulator of said coil end of the rotary electric machine, an electrical stress grading coated layer on said insulator of the coil end including the end of said earthing electrode, a shield insulator made of insulation material around said first electrical stress grading coated layer including the end of said earthing electrode, a shield electrode electrically connected to said grounding electrode around said shield insulator, and a second electrical stress grading coated layer coated on said shield insulator including the end of the said shield electrode.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 3 is a characteristic graph showing the relation of power consumption Wm of an electrical stress grading coated layer to an end length l of the coated layer in one embodiment of the invention;

FIG. 4 is a characteristic graph showing the relation of breakdown voltage of a field intensity reducing coated film to an end length l of the coated film in one embodiment of the invention;

DETAILED DESCRIPTION OF THE PREFERRED EMBODIMENTS

Figure 1:
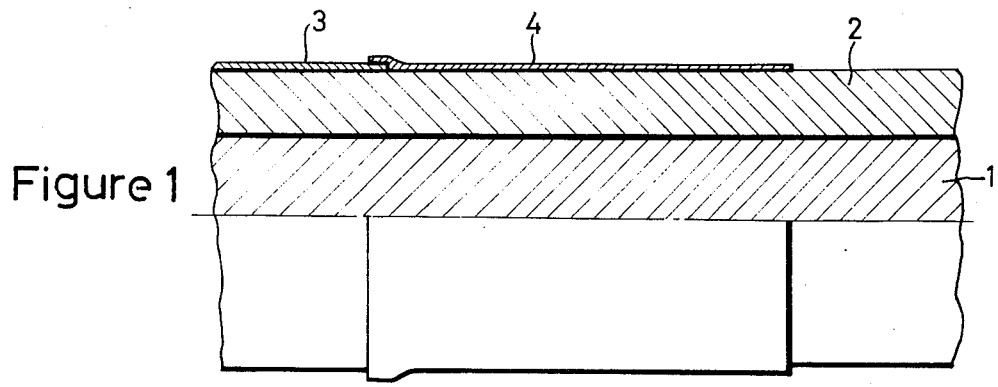
FIG. 1 is a partial sectional view of a conventional stator coil end.
Figure 2:
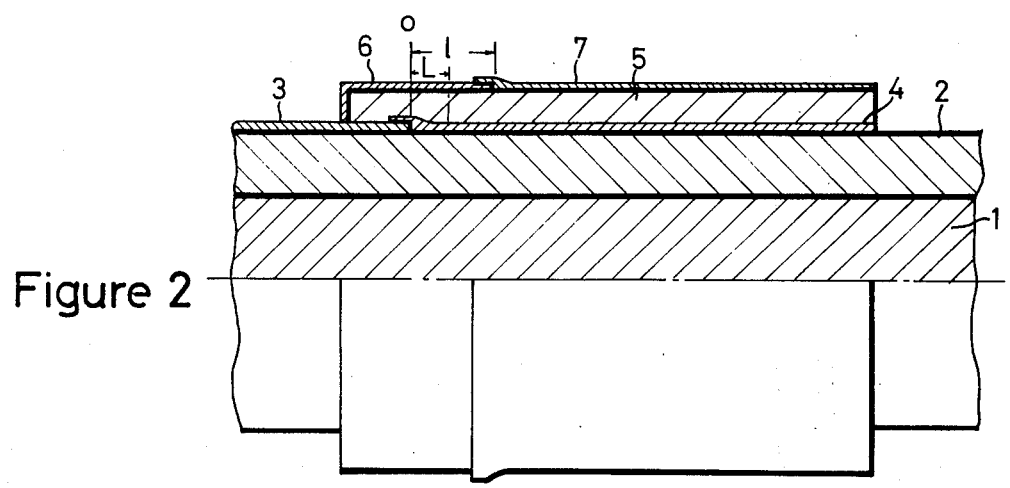
FIG. 2 is a partial sectional view of one typical embodiment of a stator coil end shown for illustrating a principle of the invention.

Referring now to the drawings, wherein like reference numerals designate identical or corresponding parts throughout the several views, and more particularly, to FIG. 2 thereof, in the partial sectional view of the stator coil end of FIG. 2, a grounding electrode 3 and a first field intensity reducing coated film 4 are provided on the surface of the insulator 2 of FIG. 1. Then, the first electrical stress grading coated layer 4 including the end of the grounding electrode 3 is covered with a sheild insulator 5 made of the insulating material of the insulator 2 of suitable thickness. Then, the shield insulator 5 is covered with a shield electrode 6 electrically connected to the grounding electrode 3 of length l from the end of the grounding electrode 3 in the opposite direction to the grounding electrode. A second electrical stress grading coated layer 7 is coated on the shield insulator 5 including the end of the shield electrode 6 for the length of the first electrical stress grading coated layer 4.

Thus, the length of the first electric stress grading coated layer 7 and the first electrical stress grading coated layer 4 is dependent upon the control field of the electrical stress grading coated layer utilized. The potential gradient of coil direction in the first electrical stress grading coated layer 4 and the second electrical stress grading coated layer 7 that is the power consumption of the electrical stress grading coated layer in the structure having the shield electrode 6 of FIG. 2 will be described.

FIG. 3 shows the characteristic graph of the calculated maximum power consumption Wm of the first electrical stress grading coated layer 4 and the second electrical stress grading coated layer 7 to the end length l of the shield electrode 6 at the stator coil end of FIG. 2.

In FIG. 3, the curve 11 represents the maximum power consumption of the first electrical stress grading coated layer 4 and the curve 12 represents the maximum power consumption of the second electrical stress grading coated layer 7. In the region of small end length l, the power consumption of the first electrical stress grading coated layer 4 is higher than that of the layer 7. In a certain end length l (in FIG. 3, $l = L$), both power consumptions are equal. When the end length $l$ is longer, the power consumption of the first electrical stress grading coated layer 4 is smaller than that of the layer 7.

The characteristics of FIG. 3 can be explained as follows. In the region of small end length $l$, the potential of the grounding electrode 3 is highly effective so that the potential distributions of the insulator 2 and the shield insulator 5 are dependent upon the non-linear property of resistance of the first electrical stress grading coated layer 4.

In the region of long end length $l$, the potential of the shield electrode 6 is highly effective so that the potential distributions of the insulator 2 and the shield insulator 5 are dependent upon the non-linear property of resistance of the second electrical stress grading coated layer 7.

In the case of $l = L$, both of the potentials of the grounding electrode 3 and the shield electrode 6 are equally effective so that the resistance of the first electrical stress grading coated layer 4 is equal to that of the layer 7. Accordingly, both power consumptions of the films are equal.

The breakdown voltage of the first or second electrical stress grading coated layers 4, 7 is calculated from the characteristics of the end length $l$ to $Wm$ of FIG. 3. The results are shown in FIG. 4 wherein the relation of the maximum power consumption $Wm$ of the electrical stress grading coated layer to the applicable voltage $V$ is considered from the relation of the equation (2) as follows, $$V \propto (Wm)^{1/2} \quad (3)$$

and the power consumption $Wm$ at the breakdown by the Joule heat is constant and the change of the voltage $V$ is shown.

In the region of the end length $l$ from zero to $L$, the power consumption of the first electrical stress grading coated layer (4) is higher than that of the layer 7 so that a breakdown is caused in the first electrical stress grading coated layer 4. In the region of the end length $l$ longer than $L$, the breakdown is caused in the second electrical stress grading coated layer 7.

In FIG. 4, the voltage applied at the breakdown of the electrical stress grading coated layer 4 in the conventional embodiment is 100% V. As shown by the curve 13 of FIG. 4, the characteristic of the maximum of the breakdown voltage (BDV) of the electrical stress grading coated layer in $l = L$ is found.

In the region of $l > L$, the breakdown voltage (BDV) is substantially constant. The constant breakdown voltage (BDV) is a specific characteristic value of the second electrical stress grading coated layer 7 disposed through the shield insulator 5. In the region of $l > L$, the second electrical stress grading coated layer 7 corresponds to the electrical stress grading coated layer 4 of the conventional one and the effect corresponds to the addition of the thickness of the shield insulator 5 and the thickness of the insulator 2.

The electrostatic capacity $c$ per unit area in Equation (2) is decreased depending upon the increase of the effect of the thickness of the insulator so that the current passed through the electrical stress grading coated layer is decreased. Accordingly, the power consumption of the electrical stress grading coated layer is decreased and the voltage $V$ given by Equation (3) is increased. The fact is well-known as an increase of breakdown voltage (BDV) is based on the effect of the thickness of the insulator.

An object of the invention is to provide a breakdown voltage (BDV) higher than the breakdown voltage given by the increase of the effect of the thickness of the insulator, that is, to prevent creeping discharge at the stator coil end having a higher rated voltage than that of the conventional one.

As shown in FIG. 4, the increase of the breakdown voltage (BDV) by the effect of the thickness of the insulator is about 110%. On the contrary, in the embodiment of the invention, the breakdown voltage (BDV) can be increased to about 130% by selecting the condition $l = L$. The invention provides a creeping discharge-prevention means or a partial discharge-prevention means for a coil having a rated voltage of about 130% to that of the conventional one by the application of the electrical stress grading coated layer.

Figure 5:
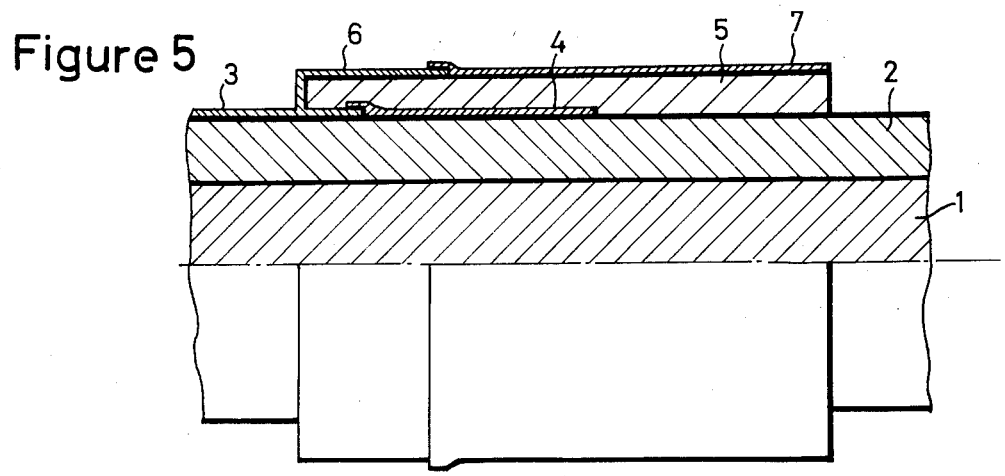
FIGS. 5, 6 and 7 are respectively partial sectional views of other embodiments of stator coil ends according to the invention.
Figure 6:
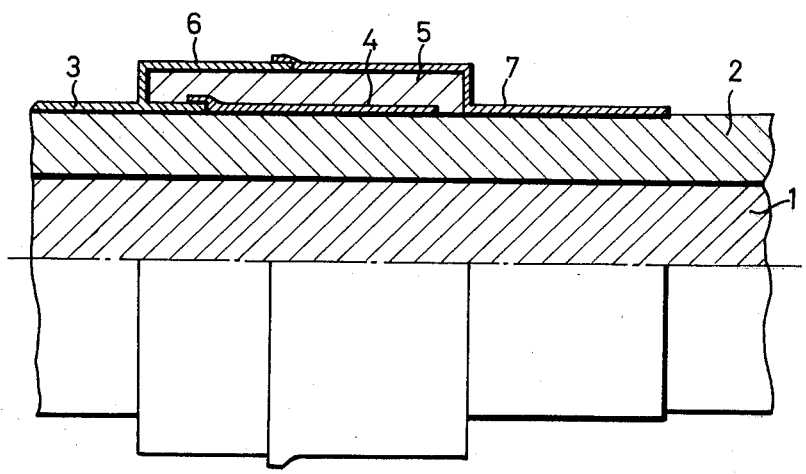

In the embodiment of FIG. 2, the end of the second field electrical stress grading coated layer 7 corresponds to that of the layer 4. However, the same effect can be attained by shortening the length of the first electrical stress grading coated layer 4 (under the condition of the same length of the second electrical stress grading coated layer 7 of FIG. 2) depending upon the end length $l$ and the control field of the coated film as shown in FIG. 5. The same effect can be also attained by shortening the shield insulator 5 as far as covering the first electrical stress grading coated layer 4 as shown in FIG. 6. It is also possible to electrically connect the second electrical stress grading coated layer 7 to the first electrical stress grading coated layer 4 as shown in FIG. 7.

Figure 7:
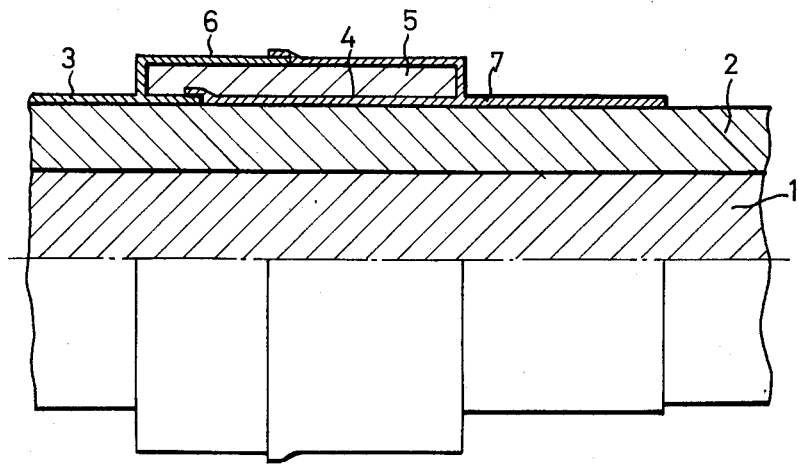

In the embodiments of FIGS. 6 and 7, the insulator material for the shield insulator 5 can be minimized. In the typical embodiment of the invention of FIG. 2, the shield insulator 5 is made of the material of the insulator 2. Thus, it is effective to use a material having a low specific inductive capacity for the shield insulator 5. The thickness of the shield insulator 5 is dependent upon the thickness of the insulator 2 as shown in FIG. 2. Thus, it is effective to increase the thickness of the shield insulator 5.

The specific inductive capacity and the thickness of the shield insulator 5 can be selected as desired. The optimum end length $l$ is $L$ which is dependent upon the electrostatic capacities of the insulator 2 and the shield insulator 5. The correct value of $L$ can be given by calculations from the electrostatic capacities. When it is sufficient to provide an increase of breakdown voltage (BDV) over the effect of thickness of the insulator (even though it is less than the case of $l = L$), the end length $l$ can be selected as desirable and is usually from 0 mm to 50 mm to attain the desired effect.

In the conventional manner of reducing the creeping field intensity on the coil surface by a potential divider wherein certain voltage dividing electrodes are disposed into the insulator 2 at the coil end, it is quite difficult to control the positions of the voltage dividing electrodes in the insulator and to operate it. In accordance with the invention, a special treatment is given around the insulator of the coil so that no effect for ground insulation as the basic function of the insulator 2 is given. The operation is therefore simple and advantageous.

The advantages of the invention are shown in the following Table wherein the material of the insulator 2 is the same as that of the shield insulator 5 and the same tests are conducted for the embodiments of the invention and the convention embodiment. As shown in the Table, the breakdown voltage of the electrical stress grading coated layer can be increased in the embodiment of the invention. Thus, the creeping discharge of the coil end of the stator having a higher rated voltage can be prevented in accordance with the invention.

|  | Embodiment of invention Figure 2 | Conventional embodiment Figure 1 |
|---|---|---|
| Electrical stress grading paint | SIB-644 (manufactured by SIB) | |
| Thickness of insulator (2) [mm] | 4.0 | |
| Thickness of shield insulator (5) [mm] | 2.0 | |
| End length l of shield electrode (6) [mm] | 10 | |
| Breakdown voltage of electrical stress grading coated layer [KV] rms | 66.0 | 51.7 |

Any type of commercial electrical stress grading paint or varnish can be used for the coated films in order to impart the effect of the invention.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A creeping discharge and partial discharge prevention means for a stator coil end of a rotary electric machine comprising:
    a grounding electrode on an insulator of the stator coil end of the rotary electric machine;
    a first electrical stress grading coated layer coated on the insulator of the stator coil end connected to an end of the grounding electrode;
    a shield insulator of insulation material disposed adjacent the first electrical stress grading coated layer connected to an end of the grounding electrode;
    a shield electrode electrically connected to the grounding electrode and disposed adjacent to the shield insulator; and
    a second electrical stress grading coated layer coated on the shield insulator connected to an end of the shield electrode.

2. The creeping discharge and partial discharge prevention means for a stator coil end according to claim 1 wherein the shield electrode extends from an end of the grounding electrode for a predetermined length in a direction away from the grounding electrode so that the first electrical stress grading coated layer and the second electrical stress grading coated layer consume equal amounts of power.

3. The creeping discharge and partial discharge prevention means for a stator coil end according to claim 1 wherein the end of the second electrical stress grading coated layer furthest from the grounding electrode is connected to the end of the first electrical stress grading coated layer furthest from the grounding electrode.

4. The creeping discharge and partial discharge prevention means for a stator coil end according to claim 1 wherein the end of the second electrical stress grading coated layer furthest from the shield electrode extends further than the end of the first electrical stress grading coated layer furthest from the grounding electrode.

5. The creeping discharge and partial discharge prevention means for a stator coil end according to claim 1 wherein a part of the second electrical stress grading coated layer is directly coated on the insulator of the coil.

6. The creeping discharge and partial discharge prevention means for a stator coil end according to claim 1 wherein the first electrical stress grading coated layer is electrically connected to the second electrical stress grading coated layer.

* * * * *